March 17, 1925. 1,530,416
M. SAEKI
ELECTRIC COOKING APPARATUS
Filed June 13, 1923
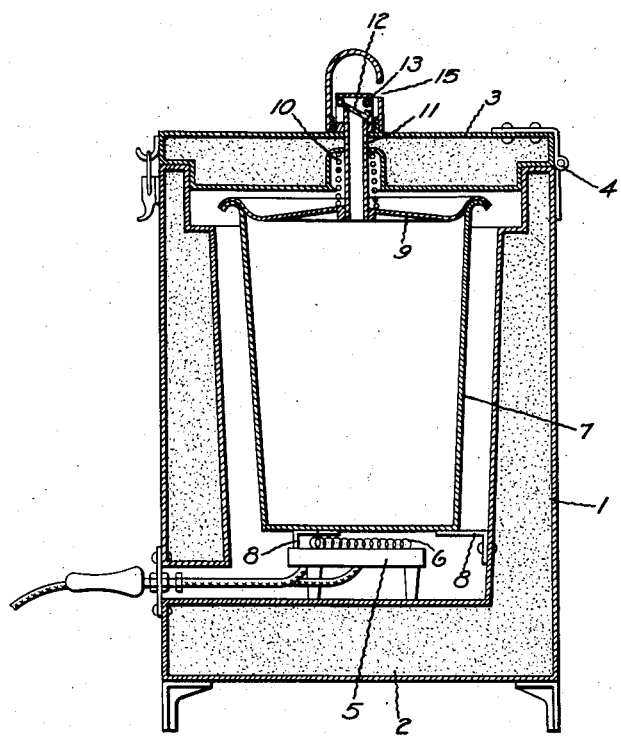
Inventor:
Masao Saeki;
by
His Attorney.

Patented Mar. 17, 1925.

1,530,416

UNITED STATES PATENT OFFICE.

MASAO SAEKI, OF TOKYO, JAPAN, ASSIGNOR TO GENERAL ELECTRIC COMPANY, A CORPORATION OF NEW YORK.

ELECTRIC COOKING APPARATUS.

Application filed June 13, 1923. Serial No. 645,063.

*To all whom it may concern:*

Be it known that I, MASAO SAEKI, a Japanese subject, residing at Tokyo, Japan, have invented certain new and useful Improvements in Electric Cooking Apparatus, of which the following is a specification.

My invention relates to electric cooking apparatus, especially to enclosed electric cooking apparatus, and has for its object to provide electric cooking means whereby electric energy may be most economically utilized for cooking and with a minimum loss of heat.

My invention affords an apparatus in which electric heat is conducted or generated in a totally enclosed chamber, the surrounding wall of the chamber being completely provided with heat insulating means. In this chamber, the cooking vessel containing food is placed and the cooking is done above the atmospheric pressure.

The attached drawing shows a section view of cooking apparatus embodying my invention.

In the embodiment shown in the drawing, the wall of the enclosed apparatus is composed of double walls filled between with good heat preserving or insulating materials. The side wall 1 and bottom wall 2 of the apparatus are made in a single body and the top wall 3 forms a hinged cover by means of the joint 4. An insulating support 5 is placed on the bottom 2 and is provided with an electric heating element 6. A kettle or pot 7 rests on supporting members 8 fixed to the side wall 1 or on the insulating supporter 5. Cover 9 of the kettle 7 may be connected to the top wall 3 by spring 10, and the cover 3, together with the cover 9, may be opened or closed through the joint 4. The cover 9 is pressed tightly in place against the body of the kettle by the spring 10 when the cover 3 is closed. In some cases the cover 9 may be hinged to the kettle according to my invention as this feature is not an essential part of my invention. The steam pipe 11 which passes through cover 9 and the top wall 3 is fixed to the top wall 3 and this pipe slidably fits in the opening in the cover 9. At the top of this tube 11 a safety valve 12 is provided; this valve may act as an electric circuit controlling device in connection with its stationary contact 13. To give an audible signal when the pressure in the kettle increases to a predetermined value, a whistle 15 is provided.

The circuit of heating coil 6 may be opened by the opening of the valve 12. Instead of a whistle 15, an electric bell which is energized through a circuit (not shown) closed by the engagement of valve 12 with the stationary contact member 13 may be provided to give a signal, if desired, when the cooking is finished.

As described above, my invention relates to an electric cooking apparatus characterized by the fact that said apparatus contains an electric heating element and a cooking kettle or pot sealed in an enclosed chamber whose surrounding wall is completely provided with heat preserving means. The apparatus according to my invention has the advantages that the consumption of electric energy may be reduced to a minimum, there being substantially no heat dissipation, that the heat can be stored for a considerable time after the electric current is cut off, and that the cooking can be done above atmospheric pressure.

What I claim as new and desire to secure by Letters Patent of the United States, is,—

1. Electric cooking apparatus comprising a heat insulated container, a cover therefor, a cooking vessel in said container, a cover therefor, and a resilient connection between said covers whereby said cooking vessel is sealed by the closing of said container, and electric heating means in said container for said cooking vessel.

2. Electric cooking apparatus comprising a heat insulated container, a cover therefor, a cooking vessel in said container, electric heating means in said container for said cooking vessel, a cover for said cooking vessel, and a resilient connection between said covers whereby said cooking vessel cover is pressed tightly in place so as to seal said cooking vessel when said container is closed.

3. Electric cooking apparatus comprising a heat insulated container, a cover therefor, a cooking vessel for said container, electric heating means in said container for said cooking vessel, a cover for said cooking vessel carried by the cover of said container so that said cooking vessel is opened and closed simultaneously with said container, and a resilient connection between said covers whereby said cooking vessel cover is pressed tightly in place to seal said cooking vessel when said container is closed.

In witness whereof, I have hereunto set my hand this 19 day of May, 1923.

MASAO SAEKI